United States Patent
Teh et al.

(10) Patent No.: US 9,891,935 B2
(45) Date of Patent: Feb. 13, 2018

(54) APPLICATION-BASED DYNAMIC HETEROGENEOUS MANY-CORE SYSTEMS AND METHODS

(71) Applicant: Altera Corporation, San Jose, CA (US)

(72) Inventors: Chee Hak Teh, Penang (MY); Kenneth Chong Yin Tan, Penang (MY)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 14/825,377

(22) Filed: Aug. 13, 2015

(65) Prior Publication Data

US 2017/0046179 A1    Feb. 16, 2017

(51) Int. Cl.
*G06F 9/445*    (2018.01)
*G06F 9/50*    (2006.01)

(52) U.S. Cl.
CPC .......... *G06F 9/44505* (2013.01); *G06F 9/445* (2013.01); *G06F 9/5044* (2013.01)

(58) Field of Classification Search
None
See application file for complete search history.

(56) References Cited

U.S. PATENT DOCUMENTS

| 7,685,396 | B2* | 3/2010 | Sze | G06F 12/023 711/100 |
| 8,544,017 | B1* | 9/2013 | Prael | G06F 9/5072 709/201 |
| 2011/0010721 | A1 | 1/2011 | Gupta et al. | |
| 2013/0198386 | A1* | 8/2013 | Srikanth | G06F 9/5061 709/226 |
| 2014/0115292 | A1* | 4/2014 | McLachlan | G06F 12/02 711/170 |
| 2014/0281472 | A1 | 9/2014 | Yalamanchili | |
| 2015/0339158 | A1* | 11/2015 | Harris | G06F 9/4881 718/103 |

OTHER PUBLICATIONS

Extended EP Search Report for EP Application No. 16184007.9 dated Jan. 12, 2017; 10 pages.

* cited by examiner

*Primary Examiner* — Lewis A Bullock, Jr.
*Assistant Examiner* — Melissa Alfred
(74) *Attorney, Agent, or Firm* — Fletcher Yoder, P.C.

(57) ABSTRACT

A method for dynamically configuring multiple processors based on needs of applications includes receiving, from an application, an acceleration request message including a task to be accelerated. The method further includes determining a type of the task and searching a database of available accelerators to dynamically select a first accelerator based on the type of the task. The method further includes sending the acceleration request message to a first acceleration interface located at a configurable processing circuit. The first acceleration interface sends the acceleration request message to a first accelerator, and the first accelerator accelerates the task upon receipt of the acceleration request message.

25 Claims, 8 Drawing Sheets

APPLICATION-BASED DYNAMIC HETEROGENEOUS MANY-CORE SYSTEMS AND METHODS

FIELD OF THE INVENTION

This invention relates to application-based dynamic heterogeneous many-core systems for application acceleration.

BACKGROUND OF THE INVENTION

Application and tasks implemented on an integrated circuit can be accelerated by using different processing mechanisms such as a many-core processing system, which is a large scale multi-CPU parallel processing system having multiple processing cores. Applications can then be processed by more than one core processor in parallel so as to improve processing speed. Typical acceleration operation using such a many-core structure requires significant investment in software and soft logic co-design. High-level design (HLD) techniques can partially bridge the software-to-logic design gap but typically require a system with fixed cores that are dedicated to serve certain application needs.

For example, some fixed circuit designs can provide a homogeneous or fixed heterogeneous many-core platform, but these designs are non-scalable. Some reprogrammable systems can offer scalable designs to add processing cores on an as-needed basis, expanded with the potential building of on-demand application-specific high-performance platform with mixed heterogeneous architecture of acceleration processing node, e.g., through a reprogrammable FPGA. These scalable solutions, however, may not cater to the scenario when a custom software solution is needed to manage the core in a dynamic system.

Other solutions and designs for application acceleration that exist in the industry can include many-core communications application programming interface (MCAPI), message passing interface (MPI), and open multi-processing (OpenMP). All of these systems assume a fixed many-core system that focuses on communication between known cores such that specific distributed tasks can be mapped to known fixed cores, instead of addressing the needs of managing a dynamic many-core system design. Thus, these systems are incapable of dynamically changing the available parallel processing cores for application acceleration.

SUMMARY OF THE INVENTION

In accordance with embodiments of the present invention, methods and systems for dynamic mapping of different parallel processing cores based on application needs are introduced.

Therefore, in accordance with embodiments of the present invention there is provided a method for dynamically configuring multiple processors based on needs of applications. The method includes receiving, from an application, an acceleration request message including a task to be accelerated. The method further includes determining a type of the task and searching a database of available accelerators to dynamically select a first accelerator based on the type of the task. The method further includes sending the acceleration request message to a first acceleration interface located at a configurable processing circuit. The first acceleration interface sends the acceleration request message to a first accelerator, and the first accelerator accelerates the task upon receipt of the acceleration request message.

In accordance with another embodiment of the present invention there is provided a heterogeneous many-core acceleration (HMA) system for dynamically configuring multiple cores based on needs of applications. The system includes a processor subsystem including a queue management unit and a dispatcher. The queue management unit receives, from an application, an acceleration request message including a task to be accelerated, and determines a type of the task. The dispatcher searches a database of available accelerators based on the type of the task to dynamically select a first accelerator based on the type of the task. The system further includes a configurable processing circuit. The configurable processing circuit includes a first acceleration interface that receives the acceleration request message from the dispatcher and sends the acceleration request message to the first accelerator when the first accelerator is available, and a first accelerator that accelerates the task upon receipt of the acceleration request message.

In accordance with another embodiment of the present invention there is provided a processor-readable non-transitory medium storing processor-executable instructions for dynamically configuring multiple cores based on needs of applications. The processor-executable instructions includes instructions executable by a processor to receive, from an application, an acceleration request message including a task to be accelerated. The processor-executable instructions further includes instructions executable by a processor to determine a type of the task. The processor-executable instructions further includes instructions executable by a processor to search a database of available accelerators to dynamically select a first accelerator based on the type of the task. The processor-executable instructions further includes instructions executable by a processor to send the acceleration request message to a first acceleration interface located at a configurable processing circuit. The first acceleration interface sends the acceleration request message to a first accelerator. The first accelerator accelerates the task upon receipt of the acceleration request message.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
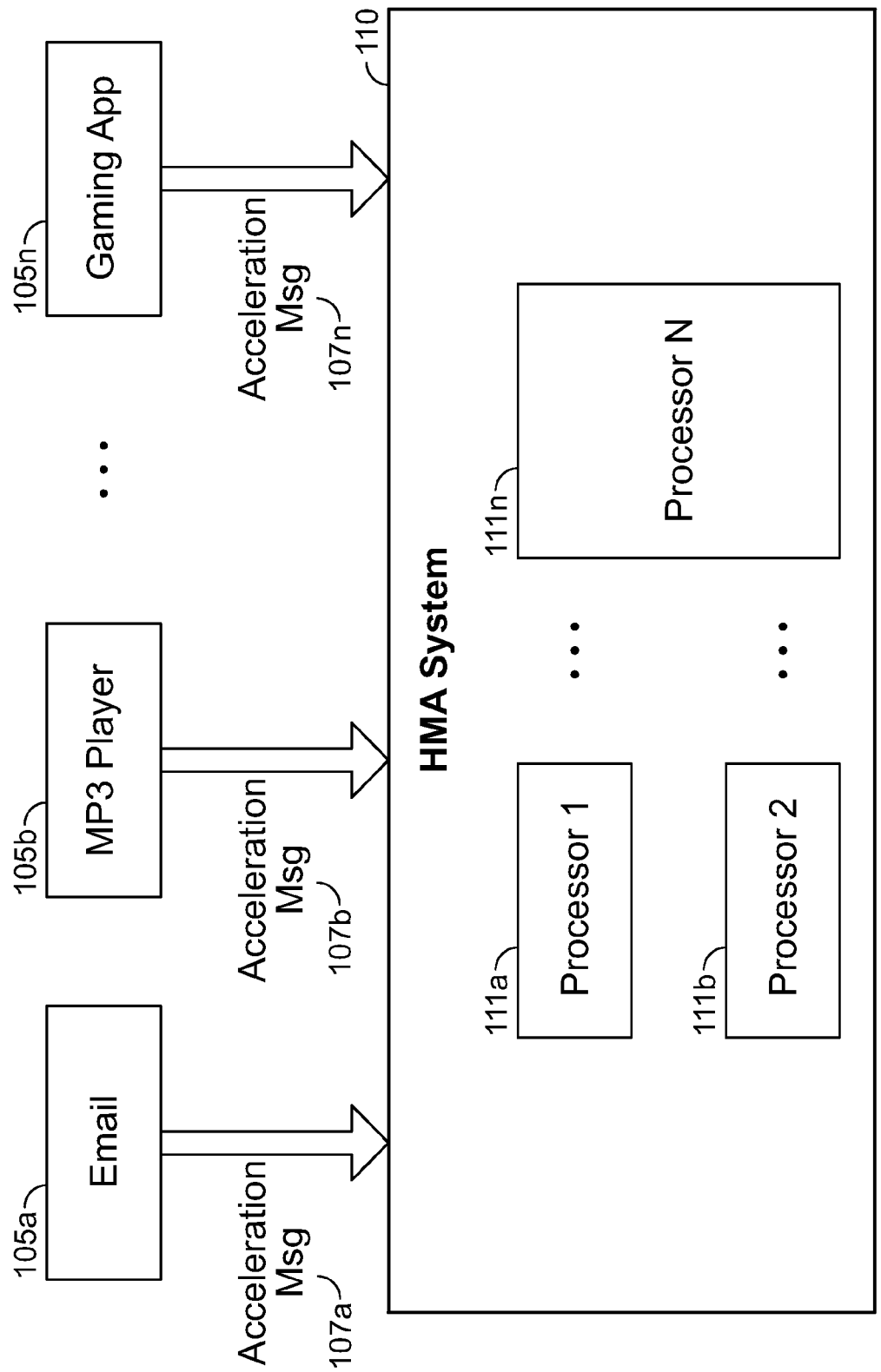
FIG. 1 shows an example block diagram illustrating aspects of handling application acceleration requests at a Heterogeneous Many-Core Acceleration (HMA) system.

Unless otherwise indicated, the discussion that follows will be based on an example of a programmable integrated circuit device such as a Field-Programmable Gate Array (FPGA). However, it should be noted that the subject matter disclosed herein may be used in any kind of fixed or programmable device, including, but not limited to, an application-specific integrated circuit (ASIC).

In some embodiments of the invention, the discussion that follows describes a heterogeneous core management system that includes a queue manager that stores application tasks, a dispatcher that abstracts the software-hardware communication channel, and an accelerator interface that receives and/or transmits application-constructed acceleration messages. The heterogeneous core management system can enable software layers to dynamically configure a set of parallel processing cores based on the needs of the application. The software layers may also rely on communication to a set of predefined hardware building blocks (with the system memory management unit (SMMU)) that can be dynamically combined with soft processing cores for acceleration. Software designs can then focus on solving application problems within a dynamic many-core system through self-sustained dynamic many-core system management.

In some embodiments of the invention, the discussion that follows describes a system that provides application acceleration/processing without the need to manage the underlying hardware. This feature can be realized through enabling hardware-management-system-agnostic application abstraction layers. The described system can enable application-driven parallel processing cores where the architecture of the core is defined by the needs of the application. The described system further allows dynamic load-balancing for a set of predefined parallel processing cores across the applications, and enables general purpose processing cores, general purpose operating systems (OS) and fixed function hardware (HW) interoperability.

In some embodiments of the invention, the described system throughout the discussion in the instant application can be implemented on a configurable processing circuit that contains an array of programmable logic blocks. The array of programmable logic blocks can be configured and programmed to be interconnected by reconfigurable interconnect units. The programmable logic blocks can be configured to host various processors, or other logic components to perform various logic, combinational or processing functions. For example, various processors such as a general-purpose processor, a specialized processor, or other soft microprocessors can be embedded or synthesized on the configurable processing circuit, and the configurable processing circuit can be configured or programmed to dynamically select and/or engage one or more of the processors, and/or virtually add or remove processors using logic synthesis, based on application needs, e.g., application acceleration request messages sent by applications. As the processors or soft processors are dynamically chosen or synthesized, no pre-defined or pre-fixed relationship between an application and a specific processor or soft processor is required.

FIG. 1 shows an example block diagram illustrating aspects of handling application acceleration requests at a Heterogeneous Many-Core Acceleration (HMA) system. As shown in FIG. 1, various software applications 105a-n may be running on a computing device and/or system, such as but not limited to a personal computer, a workstation, a server, and/or the like. The various software applications 105a-n can send acceleration messages 107a-n to a system processor to accelerate a task. For example, an email application 105a can send an acceleration message 107a for an email "send/receive" request; a MP3 player 105b can send an acceleration message 107b to request MP3 encoding/decoding; or a gaming application 105n can send an acceleration message 107n for real-time data encryption/decryption, and/or the like. An HMA system 110, e.g., located at a workstation, a server, and/or the like, can receive and process such acceleration messages 107a-n. The HMA system 110 includes multiple processors 111a-n, such as a general-purpose processor, a special-purpose processor, and/or the like to process the acceleration messages 107a-n.

Figure 2:
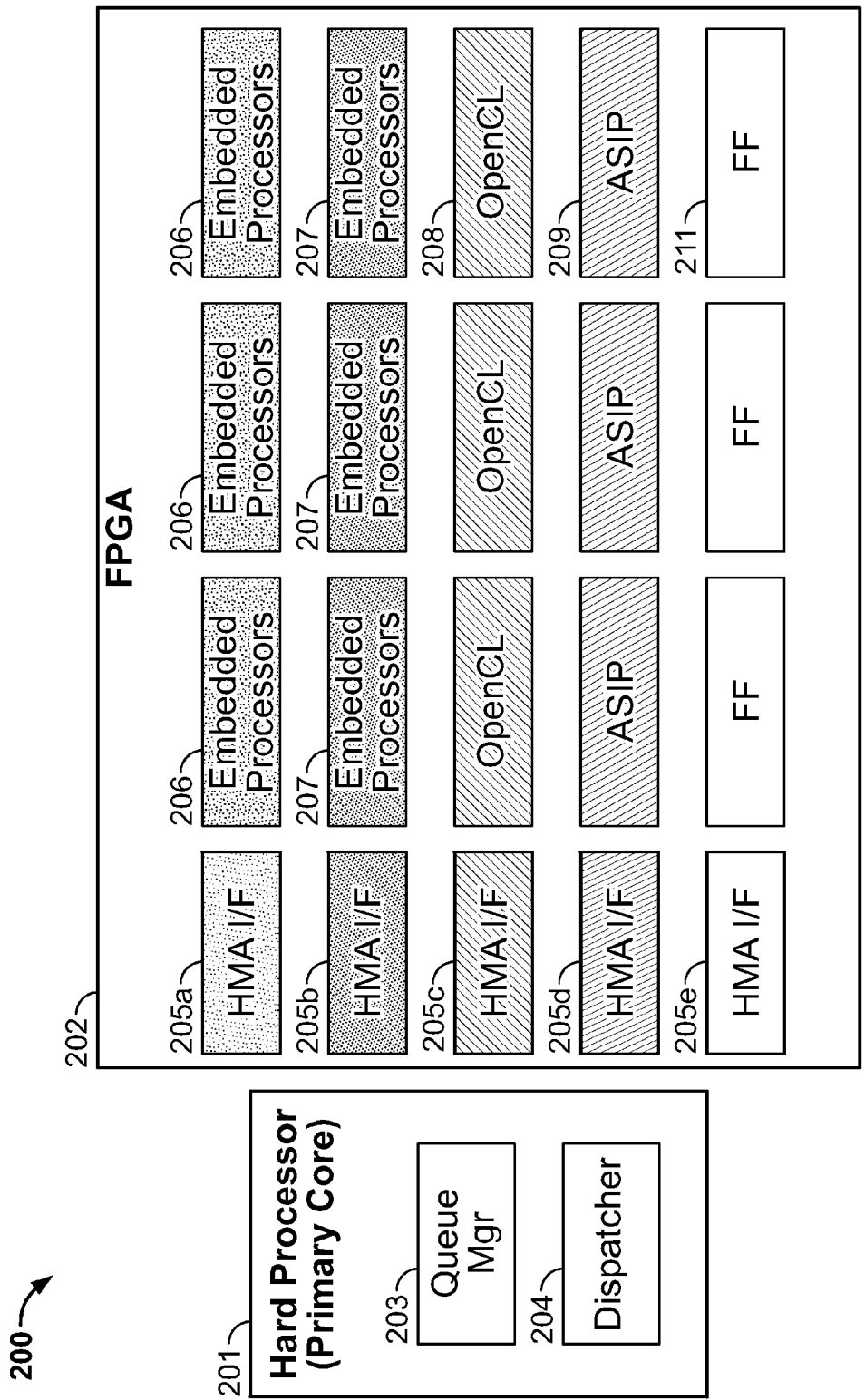
FIG. 2 shows an example block diagram illustrating an example architecture of an HMA system.

FIG. 2 shows an example block diagram illustrating an example architecture of an HMA system. The HMA system 200 may include a hard processor 201 that may be the primary core of the system, and a configurable processing circuit such as an FPGA 202. The hard processor 201 may include a queue manager 203 for application message queue management and a dispatcher 204 to handle requests to HMA software dispatching unit. The queue manager 203 can manage software message queues storing software messages, which are, for example, constructed by multicore communications application program interface (MCAPI) software layers. The dispatcher 204 can serve as a message gateway between applications and accelerators, e.g., a software resource management unit that keeps track of HMA status, and map software requests to functions offered by HMA.

The FPGA 202 includes a plurality of HMA interfaces 205a-e, which are the hardware interfaces for the dispatcher 204 to distribute work to accelerator engines that offer similar functions with the distributed work. The HMA interfaces 205a-e may parse and route tasks to available accelerators, e.g., acting as a hardware resource management unit that keeps track of individual accelerator engine status. The FPGA may include a variety of accelerators such as general-purpose embedded processors 206 or more specialized embedded processors 207, Open Computing Language (OpenCL) processors 208, application-specific instruction-set (ASIP) processors 209, fixed function (FF) blocks 211, and/or the like. For circuit design purposes, each of the accelerators can be color-coded or identified by any other kind of unique identification in a circuit map such that the circuit map can illustrate different accelerators. The accelerators can be registered for a type of the HMA interface based on a type of the accelerator. For example, the HMA interfaces 205a-e may each interface with a color code of the accelerators, as shown in the matching patterns of blocks 205a-e and 206, 207, 208, 209, 211, respectively.

Figure 3:
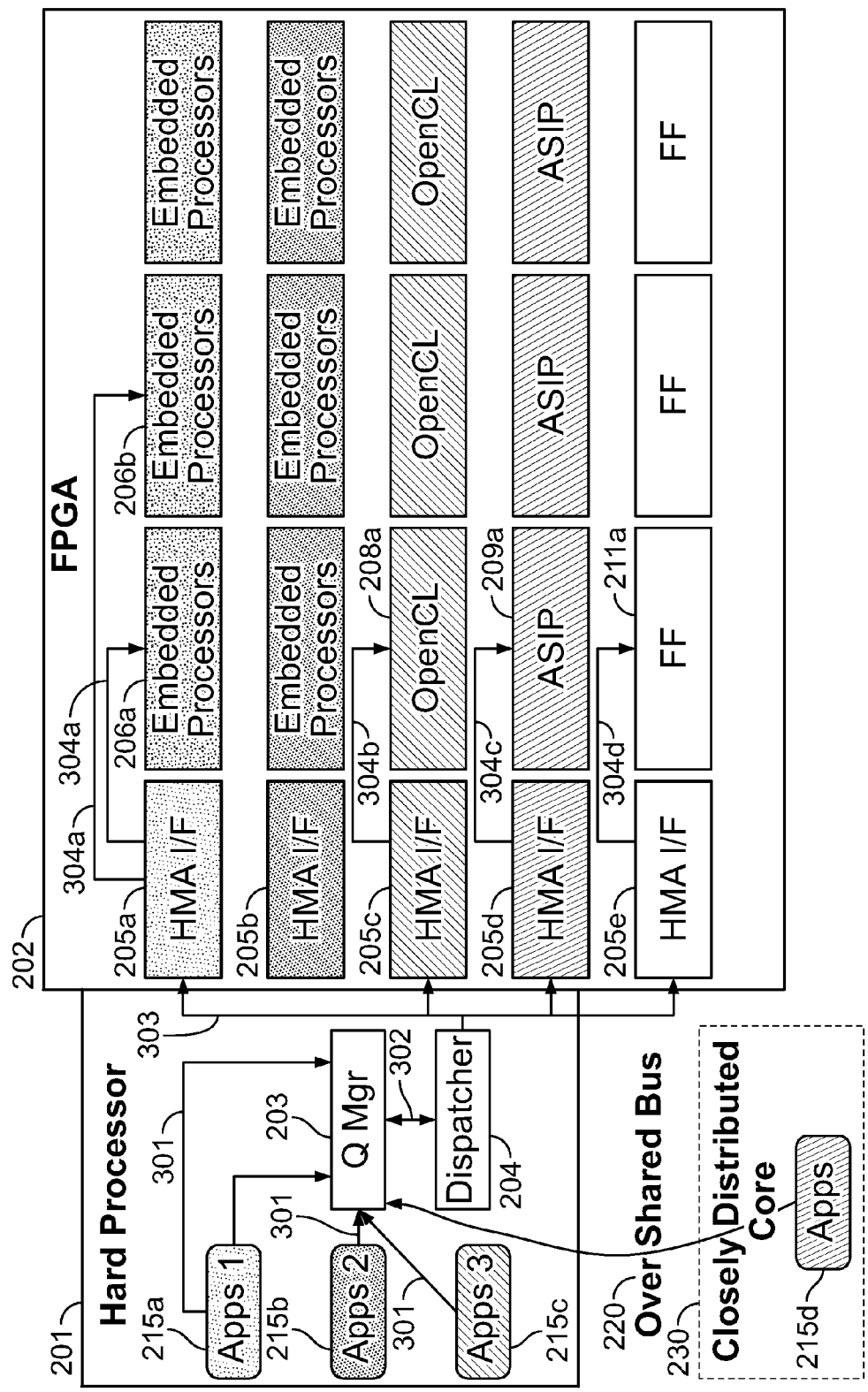
FIG. 3 shows an example flow diagram illustrating data flows within the HMA system shown in FIG. 2 for the queue manager 203 and dispatcher 204 to enable a single application access interface.

FIG. 3 shows an example flow diagram illustrating data flows within the HMA system shown in FIG. 2 for the queue manager 203 and dispatcher 204 to enable a single application access interface. Software applications can decide functions that need to be accelerated, and then construct the acceleration messages 215a-c from different applications.

The application acceleration messages 215a-c can then be sent to the queue manager 203 (e.g., as shown at arrows 301), the software message controlling and queuing unit that receives, responds to, or queues up application acceleration messages 215a-c. Each queue in the queue manager 203 is identified with and corresponds to its acceleration function. Examples of acceleration functions can include, but are not limited to, encryption, description, MP3 encoding, MP3 decoding, and/or the like. The function could also be OpenCL kernel-defined.

In a further implementation, a closely distributed core processor 230 may share the queue manager 203 in the hard processor 201. For example, the distributed core processor 230 can connect with the queue manager 203 via a shared system bus 220 (e.g., peripheral component interconnect (PCI), peripheral component interconnect express (PCIe), advanced microcontroller bus architecture (AMBA), network interface, etc.) and send application acceleration messages 215d received at the distributed core 230 to the queue manager 203 at hard processor 201.

At arrow 302, the dispatcher 204 takes the software message queue in the queue manager 203 and dispatches each acceleration message to a matching acceleration function accelerator interface (e.g., at arrow 303) based on availability of the accelerator. For example, application acceleration messages 215a may be dispatched to HMA interface 205a; application acceleration messages 215b may be dispatched to HMA interface 205b; application acceleration messages 215c may be dispatched to HMA interface 205c; and application acceleration messages 215d may be dispatched to HMA interface 205d, as shown in the matching patterns of the blocks 205a-d and 215a-d, respectively.

The dispatcher 204 may check an internal database for available accelerators and dispatch the message to accelerator interfaces 205a-e. The accelerator interfaces 205a-e may then notify available processing nodes 206a-b, 208a, 209a and 211a to pick up the message (e.g., as shown at arrows 304a-d). For example, HMA interface 205a may send a message 304a to the embedded processors 206a or 206b for acceleration, depending on availability of the processors 206a-b.

As shown in FIG. 3, the software infrastructure/layers include the application-constructed acceleration messages 215a-c, the queue manager 203 and the dispatcher 204 that abstracts the communication channel to dynamically configurable set of parallel processing cores based on the need of the application. Thus, software design can focus on solving application problems rather than optimizing software for specific hardware accelerators, and flexible acceleration cores can be dynamically constructed/deconstructed based on the application need using the available FPGA hardware. The acceleration/processing load distribution can be abstracted from application software.

Figure 4:
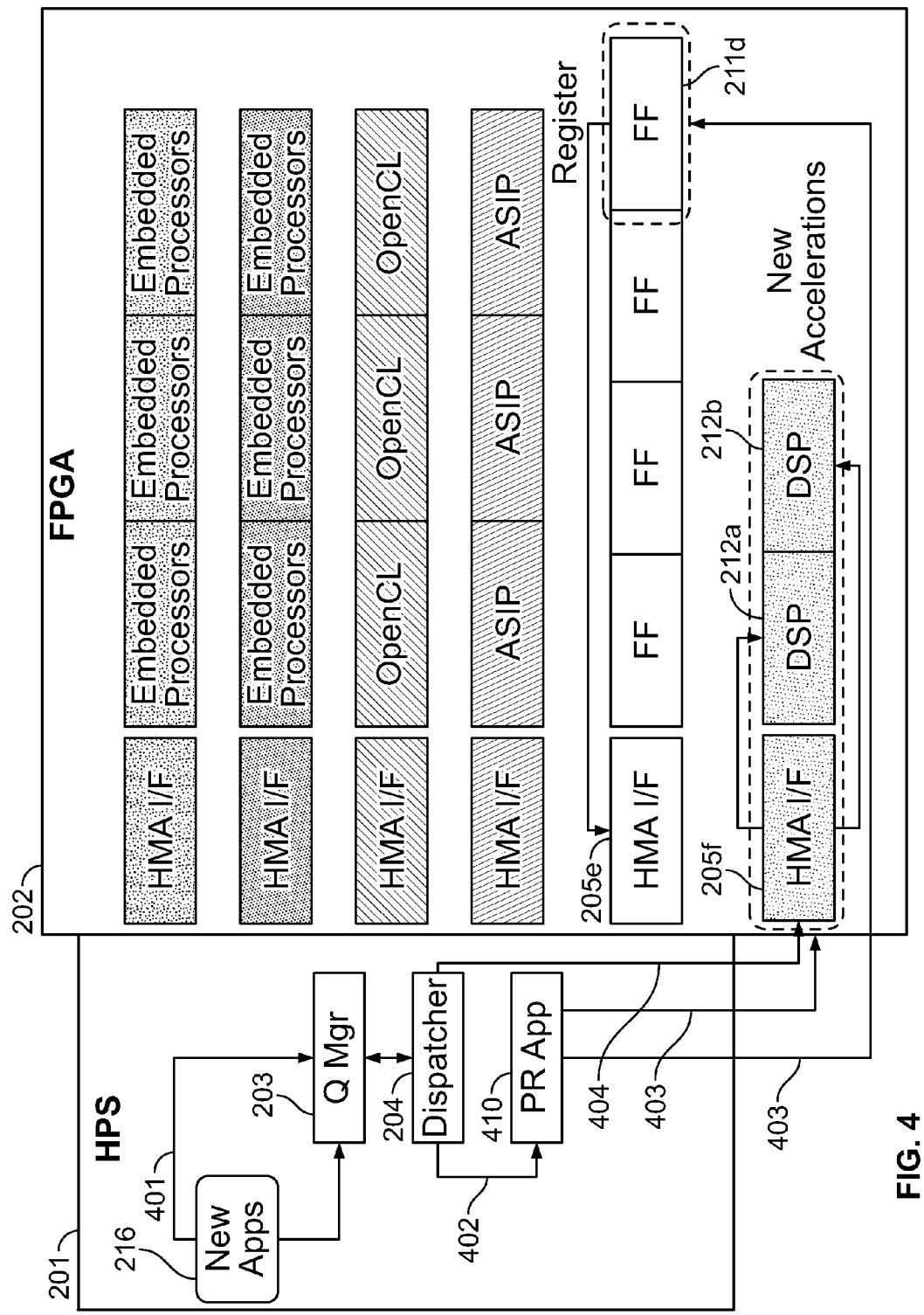
FIG. 4 shows an example flow diagram illustrating data flows within the HMA system shown in FIG. 2 for virtual expansion of accelerators with Partial Reconfiguration (PR)

FIG. 4 shows an example flow diagram illustrating data flows within the HMA system shown in FIG. 2 for virtual expansion of accelerators with Partial Reconfiguration (PR). When an acceleration message 216 from a new application is sent to the queue manager 203, e.g., at 401, the queue manager 203 may not recognize a type of the function requested by the acceleration message 216, or the requested function may not be processed at the available accelerators. In that case, the dispatcher 204 may send the acceleration message to a PR application module 410 (e.g., at 402), which may dynamically (e.g., based on the needs of the new acceleration message from the new application 216) reconfigure the logic fabric of the FPGA 202 to synthesize a soft core processor based on the needs of the new acceleration message while the remaining logic continues to operate unperturbed. For example, PR application 410 may add or synthesize an HMA interface 205f with new accelerators digital signal processors (DSP) 212a-b reconfigured on the FPGA 202, e.g., at 403. The dispatcher 204 may then send the acceleration message 216 to the newly configured HMA interface 205f for processing, e.g., at 404. Alternatively, the PR application 410 may reconfigure an additional FF 211d (if the type of acceleration function matches) that can register with existing HMA interface 205e; and the FF 211d can be used to process the new acceleration message 216.

Thus, the capacity of an FPGA fabric for hardware acceleration needs can be expanded by the virtual expansion of accelerators, without enlarging the physical size of the FPGA fabric. For example, dissimilar processing engines (e.g. ASIP, FF, other embedded processors, etc.) can be virtually added or removed from the FPGA 202 using partial logic configuration without explicit software handling or code modifications.

Figure 5:
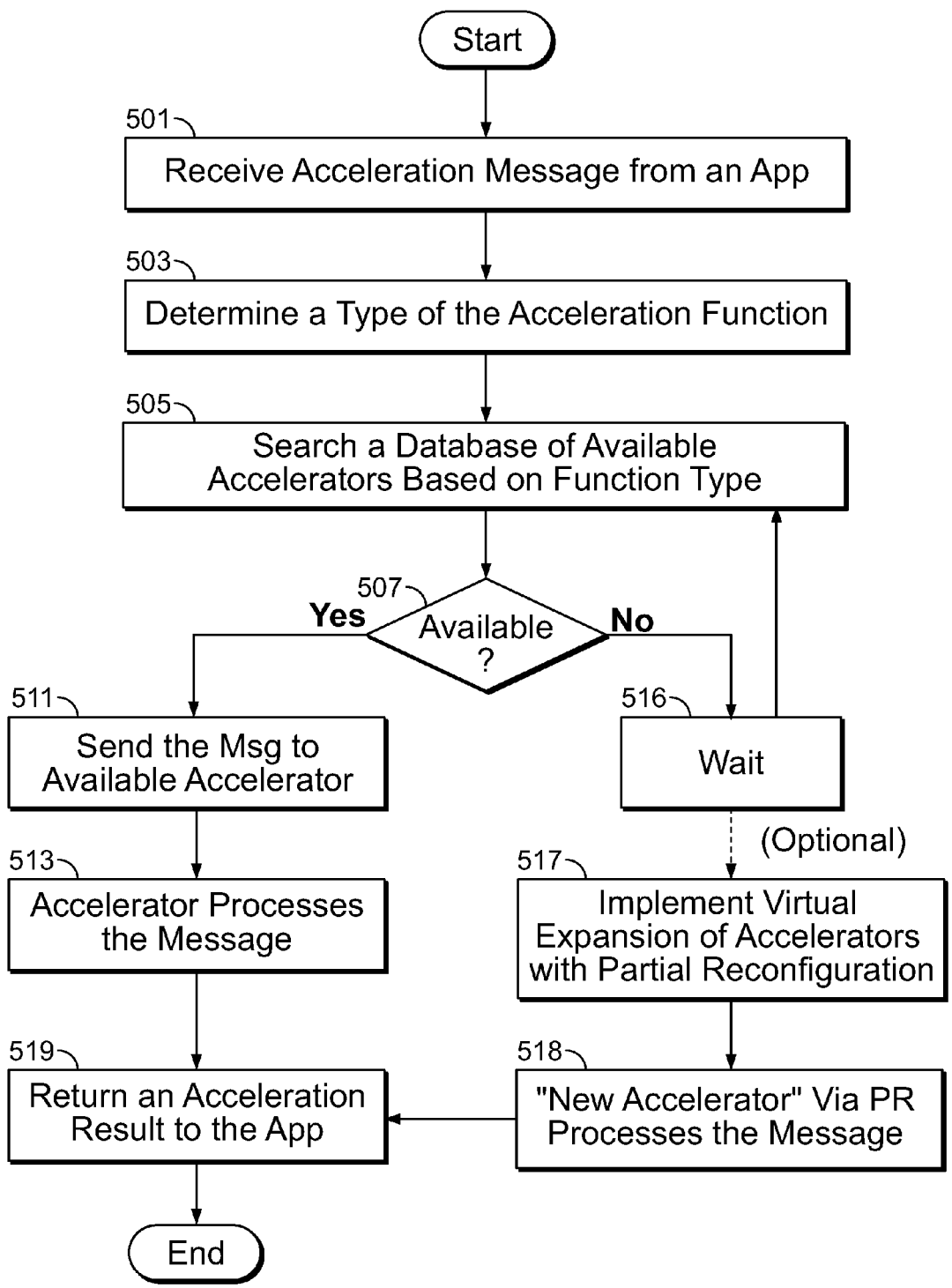
FIG. 5 shows an example logic flow diagram illustrating aspects of application-based dynamic configuration of application acceleration in the HMA systems shown in FIGS. 2-4.

FIG. 5 shows an example logic flow diagram illustrating aspects of application-based dynamic configuration of application acceleration in the HMA systems shown in FIGS. 2-4. Starting with 501, an HMA system may receive an acceleration message from an application, e.g., which may be queued up at a queue manager 203 in FIG. 2. The HMA system may then determine a type of the acceleration function at 503, e.g., based on the originating application type, task type, estimated processing time, estimated resource requirement, and/or the like. The HMA system may then search a database of available accelerators in the HMA system based on the function type at 505. When there are available accelerators at 507, the HMA system may send the acceleration message to the available accelerator at 511, which may in turn process the acceleration message at 513 to accelerate the respective application task.

When no accelerator is available at 507, the HMA system may wait for the next available accelerator at 516. Or alternatively and optionally, the HMA system may implement virtual expansion of accelerators with partial reconfiguration (PR) at 517 (as discussed in FIG. 4) such that a new accelerator via PR expansion can process the acceleration message at 518. The new accelerator may then return the computed result (e.g., the acceleration result, etc.) to the application upon completing the acceleration or computation, at 519.

Figure 6:
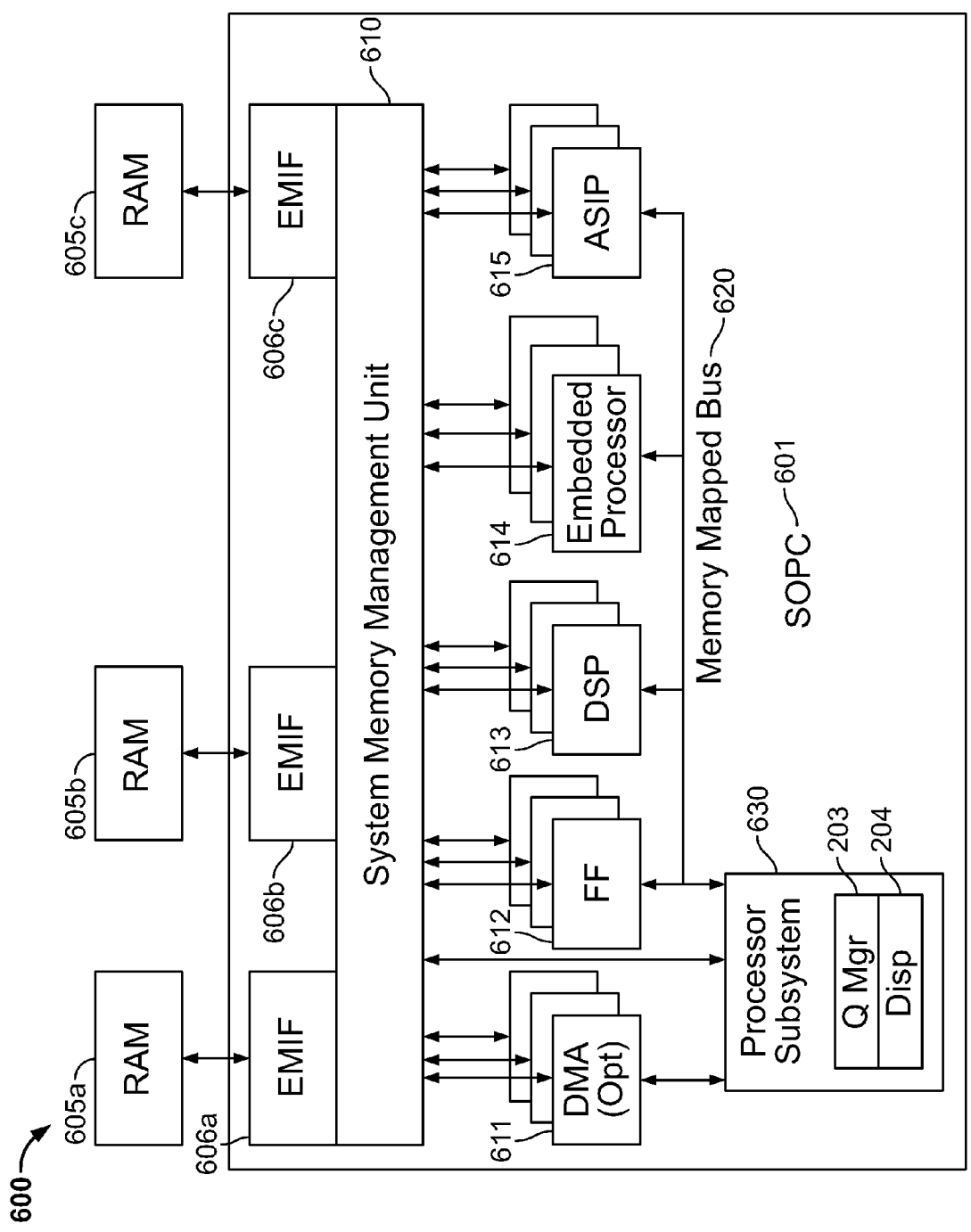
FIG. 6 shows an example block diagram illustrating hardware architecture of the HMA hardware subsystem 600.

FIG. 6 shows an example block diagram illustrating a hardware architecture of the HMA hardware subsystem 600. The HMA subsystem 600 can be built as a system on a programmable chip (SOPC). The queue manager 203 and/or the dispatcher 204 software can run on a processor subsystem 630. The processor subsystem 630 can act as the main software-hardware interface for the HMA subsystem 600, and communicate with an optional direct memory access (DMA) unit 611 for movement of data from the system memory to be processed if needed. The queue manager 203 and/or the dispatcher 204 software can communicate with the various accelerator blocks 612, 613, 614 and 615 of the HMA via a memory mapped bus 620.

Accelerators 612-615 can be built from HMA building blocks combined with FPGA soft fabric that can be used to construct acceleration engines. The HMA building blocks provide software-hardware interface and memory interface, which can include external memory interfaces 606a-c (EMIF) that interface the SMMU 610 and external memory unit such as random-access memory (RAM) units 605a-c. The software-hardware interface including the memory-mapped system bus 620 and the SMMU 610 may virtualize selective accesses to system memory to reduce physical data movement even across different physical memories. For example, data movement throughout the system can be realized without physically moving the data, e.g., by simply remapping the memory map within the SMMU 610 to virtually move data in system memory. In this way, power consumption can be reduced due to processing data movement when switching from one core to another. The processing memory can be spread for the HMA systems to be distributed across different physical memory. Chained processing/acceleration of raw data via multiple processing/acceleration engines can thus be realized (e.g. sequence of rendering an image), and system memory protection policies can be enforced by restricting certain applications from accessing portions of the accelerator/core memory.

The SMMU 610 can virtualize selective accesses to system memory (e.g., RAM 605*a-c*) and may help to reduce physical data movement, e.g., by allowing physical memory to be scattered (even across multiple physical memory interfaces 606*a-c*) and abstracting system memory addressing, enforcing memory protection/integrity, and/or the like. In this case, as the HMA system can be partially reconfigured (discussed in connection with FIG. 4), the SMMU 610 can implement selective access to system memory such that only data related to the partial reconfiguration needs to be loaded or transmitted, without loading an entire program of the FPGA soft fabric.

Figure 7:
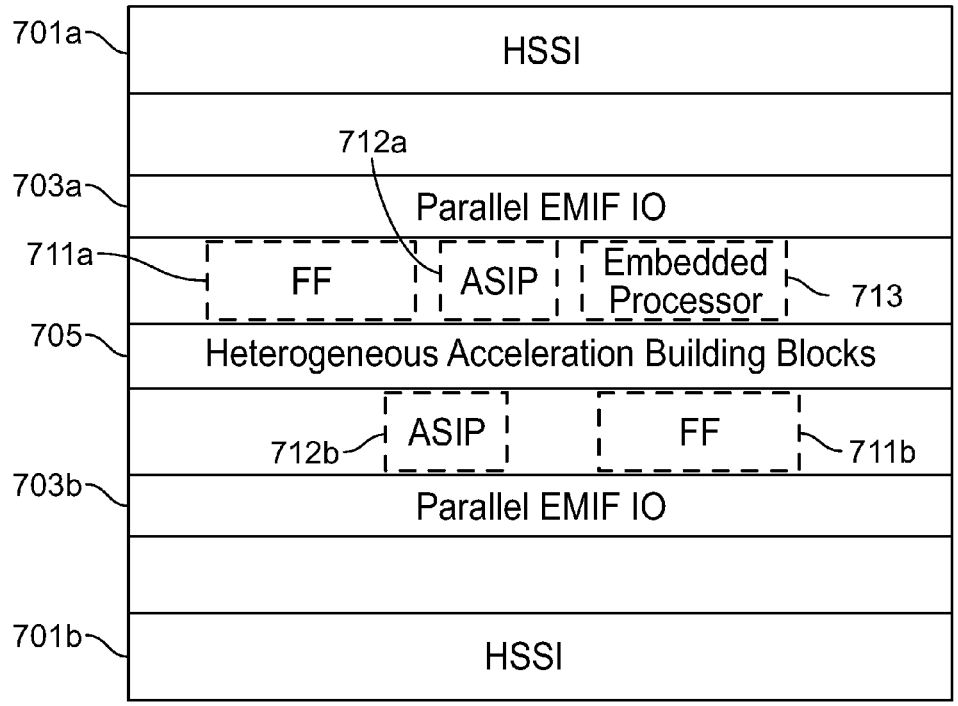
FIGS. 7-8 show example block diagrams illustrating hardware architecture of the HMA components (e.g., HMA building blocks)
Figure 8:
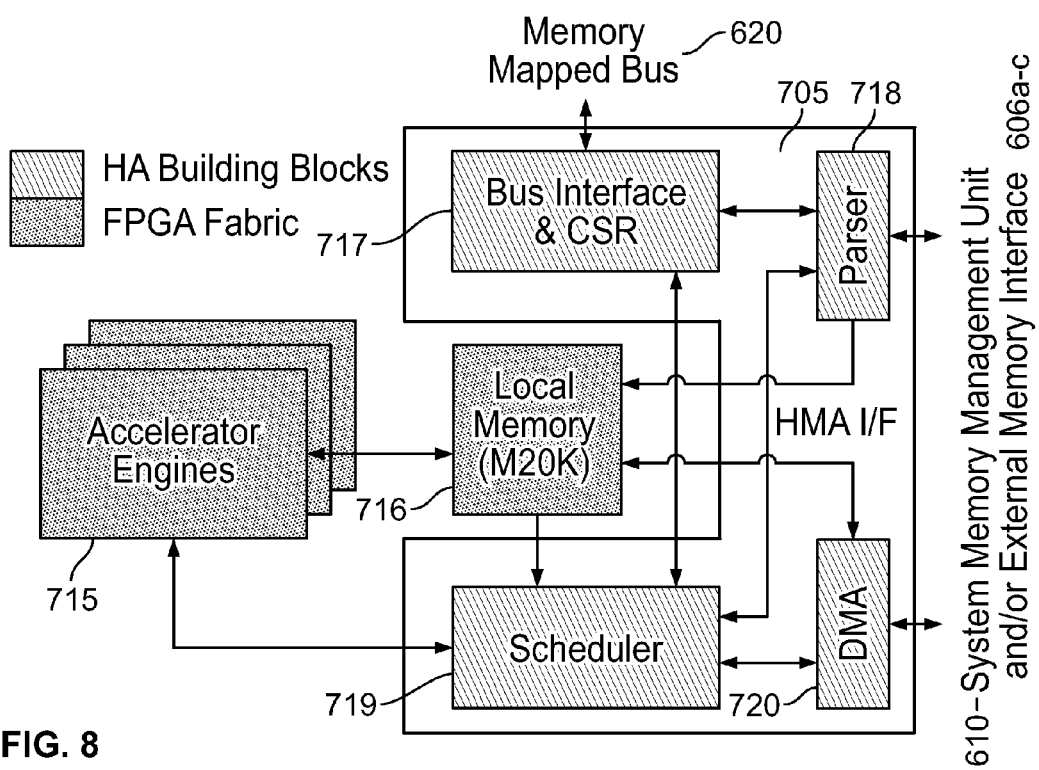

FIGS. 7-8 show example block diagrams illustrating a hardware architecture of the HMA components (e.g., HMA building blocks). As shown in FIG. 7, an HMA building block can have columns of high-speed serial interfaces (HSSI) 701*a-b*, and parallel EMIF input/output 703*a-b* to communicate with accelerators such as FF 711*a-b*, ASIP 712*a-b*, embedded processor 713, and/or the like. A heterogeneous acceleration building block 705, which can be a hardware component that controls the accelerators, as further illustrated in FIG. 8, can be placed between layers of accelerators, as shown in FIG. 7.

The HMA subsystem may have a column-based implementation for data stores, and communicate with initiators via ring queue descriptors. For example, initiators (e.g., an application acceleration requester, etc.) can build ring queue request descriptors and initiate HMA via a configuration and status register (CSR). The initiators can then be informed of acceleration completion via interrupt (or other mechanisms).

FIG. 8 shows the heterogeneous acceleration (HA) building block structure and its interaction with an FPGA fabric (e.g., accelerator engines 715, local memory 716, etc.). As shown in FIG. 8, the set of HMA hardware building blocks 705 including the bus interface (and CSR) 717, a parser 718, a DMA unit 720, and a scheduler 719, can be dynamically "glued" with soft processing engines 715 constructed on the FPGA core fabric to form the set of parallel processing/acceleration cores. In this way, any processing/acceleration function can communicate with the accelerator engines via the software infrastructure/layers defined. Software-controlled load balancing can then be done dynamically by abstracting the processing engines from the communication medium.

The bus interface 717 (and CSR) may interface with memory mapped bus 620 and contain the CSR as software interface. The DMA 720 and the parser 718 may communicate with the SMMU 610 and EMIF 606*a-c* (also shown in FIG. 6) to load data and update status information. The DMA 720 and the parser 718 may also communicate with local memory 716 to retrieve or store application tasks and/or acceleration messages. For example, the parser 718 may traverse request descriptors and update the status of the tasks when done; and the DMA 720 may pull processing data from SMMU 610 (or via the EMIF 606*a-c*) and deposit processed data to SMMU 610. The scheduler 719 may initiate engine acceleration based on descriptors and distributes the workload across multiple acceleration engines 715.

Because the FPGA fabric (e.g., including the accelerator engines 715 and local memory 716) can be dynamically "glued" or combined with an HMA building block 705, a larger than physically available FPGA fabric for hardware acceleration needs can be realized. The dynamic matching/configuration of accelerator engines 715 can also allow construction/deconstruction of dissimilar processing engines (e.g. ASIP, FF, other embedded processors, etc.) without affecting application software function.

Figure 9:
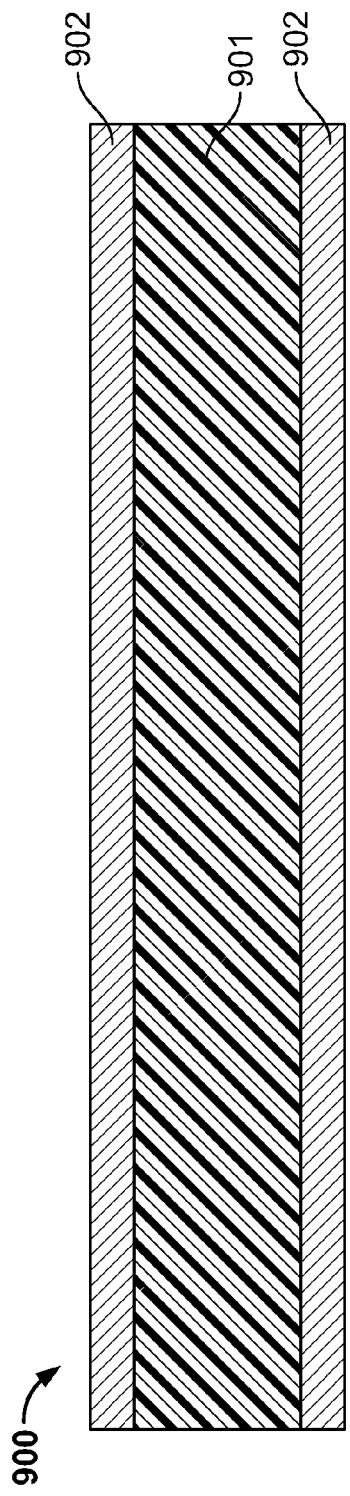
FIG. 9 presents a cross section of a magnetic data storage medium 900 which can be encoded with a machine executable program for performing methods according to embodiments of the invention.

FIG. 9 presents a cross section of a magnetic data storage medium 900 which can be encoded with a machine executable program that can be carried out by systems such as a personal computer, or other computer or similar device, for configuring FPGAs or other programmable logic devices (PLDs) for use in systems as described above. Medium 900 can be a floppy diskette or hard disk, or magnetic tape, having a suitable substrate 901, which may be conventional, and a suitable coating 902, which may be conventional, on one or both sides, containing magnetic domains (not visible) whose polarity or orientation can be altered magnetically. Except in the case where it is magnetic tape, medium 900 may also have an opening (not shown) for receiving the spindle of a disk drive or other data storage device.

The magnetic domains of coating 902 of medium 900 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 10:
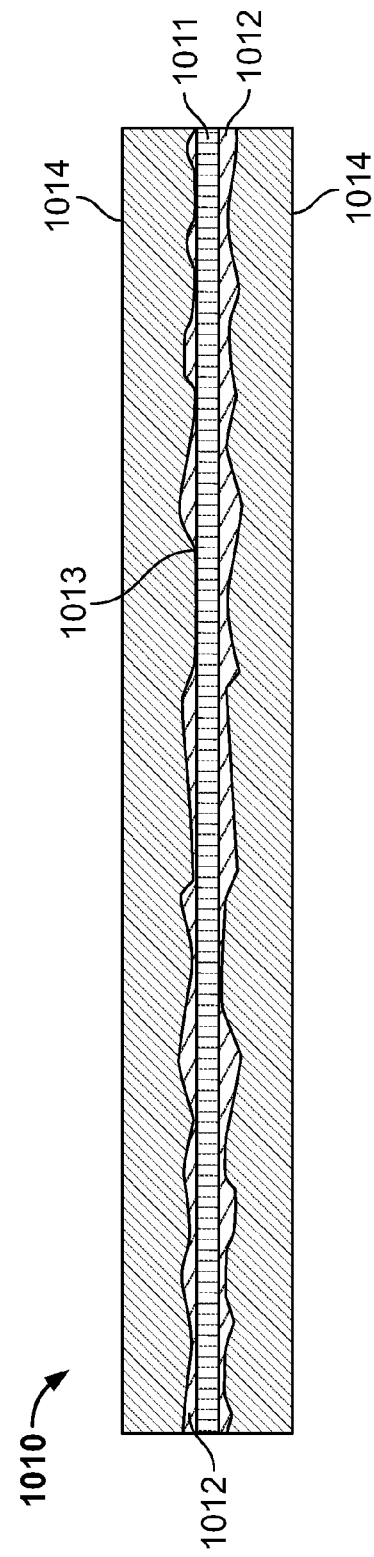
FIG. 10 shows a cross section of an optically-readable data storage medium 1010 which can be encoded with a machine-executable program for performing methods according to embodiments of the invention.

FIG. 10 shows a cross section of an optically-readable data storage medium 1010 which also can be encoded with such a machine-executable program, which can be carried out by systems such as the aforementioned personal computer, or other computer or similar device. Medium 1010 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1010 preferably has a suitable substrate 1011, which may be conventional, and a suitable coating 1012, which may be conventional, usually on one or both sides of substrate 1011.

In the case of a CD-based or DVD-based medium, as is well known, coating 1012 is reflective and is impressed with a plurality of pits 1013, arranged on one or more layers, to encode the machine-executable program. The arrangement of pits is read by reflecting laser light off the surface of coating 1012. A protective coating 1014, which preferably is substantially transparent, is provided on top of coating 1012.

In the case of magneto-optical disk, as is well known, coating 1012 has no pits 1013, but has a plurality of magnetic domains whose polarity or orientation can be changed magnetically when heated above a certain temperature, as by a laser (not shown). The orientation of the domains can be read by measuring the polarization of laser light reflected from coating 1012. The arrangement of the domains encodes the program as described above.

It will be understood that the foregoing is only illustrative of the principles of the invention, and that various modifications can be made by those skilled in the art without departing from the scope and spirit of the invention. For example, various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method for dynamically configuring multiple processors based on needs of applications, comprising:
receiving, by a queue management unit, an acceleration request from an application, including an application task to be accelerated;
determining, by the queue management unit, an application type of the application task, wherein the application type is based on an originating application type of the application task;
when the queue management unit determines the application type:
storing, by the queue management unit, the acceleration request in a queue based on the application type of the application task;
searching, by a dispatcher, a database of available accelerators for a first accelerator that is configured to process the application type; and
when the dispatcher identifies the first accelerator configured to process the application type of task, dynamically selecting the first accelerator and sending the acceleration request message to a first acceleration interface located at a configurable processing circuit based on the application type of the application task; and
when the queue management unit does not determine the application type:
sending, by the dispatcher, an acceleration message to a partial reconfiguration application module;
dynamically constructing, by the partial reconfiguration application module, the first accelerator by reconfiguring a reconfigurable logic fabric of a configurable processing circuit, wherein the configurable processing circuit comprises the reconfigurable logic fabric and
sending, by the dispatcher, the acceleration request message to the first acceleration interface, wherein:
the first acceleration interface sends the acceleration request message to the first accelerator, and
the first accelerator executes the application task upon receipt of the acceleration request message.

2. The method of claim 1, wherein the acceleration request message is received at a queue management unit to enter a queue based on the application type of the application task.

3. The method of claim 2, wherein the queue management unit sends the acceleration request message to a dispatcher that matches the acceleration request message to the first acceleration interface.

4. The method of claim 1, wherein:
the configurable processing circuit hosts the first acceleration interface and a second acceleration interface;
the first acceleration interface is communicatively coupled to the first accelerator based on a first type of the first accelerator; and
the second acceleration interface is communicatively coupled to a second accelerator based on a second type of the second accelerator.

5. The method of claim 4, wherein the first acceleration interface is communicatively coupled to a third accelerator of the first type.

6. The method of claim 4, wherein the first accelerator and the second accelerator form a parallel processing structure.

7. The method of claim 1, wherein the first accelerator includes any of a general-purpose processor, a specialized embedded processor, an Open Computing Language (OpenCL) processor, an application-specific instruction-set (ASIP) processor, a fixed function (FF) processor, or a digital signal processor (DSP).

8. The method of claim 1, wherein the first accelerator is dynamically chosen from the database of available accelerators based on an acceleration need of the application without a fixed or predefined mapping between the application and the first accelerator.

9. The method of claim 1, further comprising:
dynamically constructing a second accelerator via logic synthesis on existing hardware of the configurable processing circuit without interrupting an operation of other parts.

10. The method of claim 1, further comprising:
removing the first accelerator via logic configuration from the configurable processing circuit without interrupting an operation of other parts of the configurable processing circuit when the task is completed by the first accelerator.

11. A heterogeneous many-core acceleration (HMA) system for dynamically configuring multiple cores based on needs of applications, comprising:
a processor subsystem including a queue management unit, a dispatcher, and a partial reconfiguration application module, wherein:
the queue management unit receives an acceleration request message from an application, the acceleration request message from an application including a task to be accelerated, and determines, by a the queue management unit, an application type of the task, wherein the application type is based on an originating application type of the task;
when the queue management unit determines the application type:
the queue management unit stores the acceleration request in a queue based on the application type of the task;
the dispatcher searches a database of available accelerators for a first accelerator that is configured to process the application type;
when the dispatcher identifies the first accelerator that processes the type of the task, dynamically selecting the first accelerator based on the type of the task; and
when the dispatcher does not identify the first accelerator that is configured to process the application type, the partial reconfiguration application module dynamically builds the first accelerator by reconfiguring reconfigurable logic fabric of a configurable processing circuit; and
when the queue management unit does not determine the application type of the task:
the dispatcher sends an acceleration message to a partial reconfiguration application module; and the partial reconfiguration application module dynamically builds the first accelerator by reconfiguring reconfigurable logic fabric of the configurable processing circuit;

the configurable processing circuit comprising the reconfigurable logic fabric, including:
a first acceleration interface that receives the acceleration request message from the dispatcher and sends the acceleration request message to the first accelerator, and
a first accelerator that executes the task upon receipt of the acceleration request message.

12. The system of claim 11, further comprising a plurality of hardware elements, wherein:
each of the plurality of hardware elements includes any of a bus interface, a parser, a direct memory access (DMA) engine or a scheduler.

13. The system of claim 12, further comprising:
a memory-mapped system bus communicatively coupled to one of the plurality of hardware elements.

14. The system of claim 13, further comprising:
a system memory management unit (SMMU) that remap a memory map within the SMMU to virtually move data in the HMA system without physically moving the data.

15. The system of claim 14, further comprising:
a system memory that stores instructions to dynamically configure the configurable processing circuit,
wherein the SMMU virtualizes selective access to the system memory when the configurable processing circuit is partially reconfigured without interrupting an operation of other parts of the configurable processing circuit.

16. The system of claim 11, wherein the configurable processing circuit includes a second accelerator, and the first accelerator and the second accelerator form a set of parallel processing cores.

17. The system of claim 11, wherein,
when the dispatcher does not identify the first accelerator that processes the type of the task, the first accelerator is constructed via logic synthesis on the configurable processing circuit without interrupting an operation of other parts of the configurable processing circuit.

18. The system of claim 11, wherein,
when the dispatcher identifies the first accelerator that processes the type of the task, the first accelerator is dynamically chosen from the database of available accelerators based on an acceleration need of the application without a fixed or predefined mapping between the application and the first accelerator.

19. The system of claim 11, wherein the first accelerator is removed using logic configuration from the configurable processing circuit without interrupting an operation of other parts of the configurable processing circuit when the task is completed by the first accelerator.

20. The system of claim 11, wherein the first accelerator returns an acceleration result to the application over a memory-mapped shared memory in response to the acceleration request message.

21. The system of claim 11, wherein the configurable processing circuit further includes a second accelerator communicatively coupled to the first acceleration interface.

22. A processor-readable non-transitory medium storing processor-executable instructions for dynamically configuring multiple cores based on needs of applications, the processor-executable instructions comprising:

instructions executable by a processor to receive, by a queue management unit, an acceleration request message from an application including a task to be accelerated;
instructions executable by the processor to determine, by the queue management unit, an application type of the task, wherein the application type is based on an originating application type of the task;
when the application type is determined:
instructions executable by the processor to store, by the queue management unit, the acceleration request in a queue based on the application type of the task;
instructions executable by the processor to search, by a dispatcher, a database of available accelerators for a first accelerator that is configured to process the application type;
when the dispatcher identifies the first accelerator that is configured to process the application type, instructions executable by the processor to dynamically select the first accelerator based on the application type of the task; and
when the dispatcher does not identify the first accelerator that processes the application type of the task, instructions executable by the processor to dynamically synthesize the first accelerator by reconfiguring reconfigurable logic fabric of a configurable processing circuit;
when the application type is not determined:
instructions executable by the processor to send, by the dispatcher, an acceleration message to a partial reconfiguration application module; and
instructions executable by the processor to dynamically construct, by the partial reconfiguration application module, the first accelerator by reconfiguring reconfigurable logic fabric of the configurable processing circuit wherein the configurable processing circuit comprises the reconfigurable logic fabric; and
instructions executable by the processor to send, by the dispatcher, the acceleration request message to a first acceleration interface located at the configurable processing circuit, wherein:
the first acceleration interface sends the acceleration request message to the first accelerator; and
the first accelerator executes the task upon receipt of the acceleration request message.

23. The medium of claim 22, wherein,
when the processor identifies the first accelerator that processes the type of the task, the first accelerator is dynamically chosen from the database of available accelerators based on an acceleration need of the application without a fixed or predefined mapping between the application and the first accelerator.

24. The medium of claim 22, further comprising:
instructions executable by the processor to dynamically construct a second accelerator via logic synthesis on existing hardware of the configurable processing circuit without interrupting an operation of other parts of the configurable processing circuit when the first accelerator is unavailable.

25. The medium of claim 22, further comprising:
instructions executable by the processor to remove the first accelerator via logic configuration on the configurable processing circuit without interrupting an operation of other parts of the configurable processing circuit when the task is completed by the first accelerator.

* * * * *